United States Patent [19]
Krumbein et al.

[11] 3,825,218
[45] July 23, 1974

[54] PROJECTOR WITH ADJUSTABLE IMAGE REFLECTING MIRROR

[75] Inventors: Fritz Krumbein, Stuttgart-Mohringen; Hans Lieckfeldt, Stuttgart, both of Germany

[73] Assignee: Robert Bosch Photokino GmbH, Stuttgart, Germany

[22] Filed: Nov. 27, 1972

[21] Appl. No.: 309,650

[30] Foreign Application Priority Data
Nov. 25, 1971 Germany............................ 7144352

[52] U.S. Cl..................... 248/466, 353/98, 403/81, 403/98
[51] Int. Cl. .......................................... G03b 21/28
[58] Field of Search .......... 248/476, 479, 480, 484, 248/486, 488, 466, 276, 284, 286; 353/71, 98, 99, 101; 95/DIG. 2; 355/45; 350/289; 403/81, 92, 98, 103, 145, 146

[56] References Cited
UNITED STATES PATENTS

| 129,239 | 7/1872 | Lancaster | 403/146 |
| 1,903,314 | 4/1933 | Ornberg | 248/284 X |
| 2,517,414 | 8/1950 | Pratt et al. | 355/45 |
| 2,734,710 | 2/1956 | Noble | 248/276 |
| 3,447,869 | 6/1969 | Szymber | 353/71 |
| 3,479,116 | 11/1969 | Anderson | 353/98 X |
| 3,507,572 | 4/1970 | Nemesnyik | 353/98 |

FOREIGN PATENTS OR APPLICATIONS

| 1,331,613 | 5/1963 | France | 248/284 |
| 994,457 | 6/1965 | Great Britain | 350/289 |
| 118,721 | 9/1918 | Great Britain | 353/99 |

Primary Examiner—Ramon S. Britts
Assistant Examiner—Thomas J. Holko
Attorney, Agent, or Firm—Michael S. Striker

[57] ABSTRACT

A projector wherein the housing supports a mirror which is pivotable from an inoperative position to any one of a number of image projecting positions. The mirror has a projection extending into an arcuate slot provided in a selector which is adjustable relative to the housing about the pivot axis of the mirror by way of a rotary cam. By rotating the cam, the user of the projector can move the mirror by way of the selector to and from any desired projecting position. The mirror can be yieldably biased against the selector so that it normally shares the movements of the selector but can be pivoted relative to the selector in order to be moved to and from its inoperative position. The selector cannot change the angular position of the cam.

16 Claims, 6 Drawing Figures

3,825,218
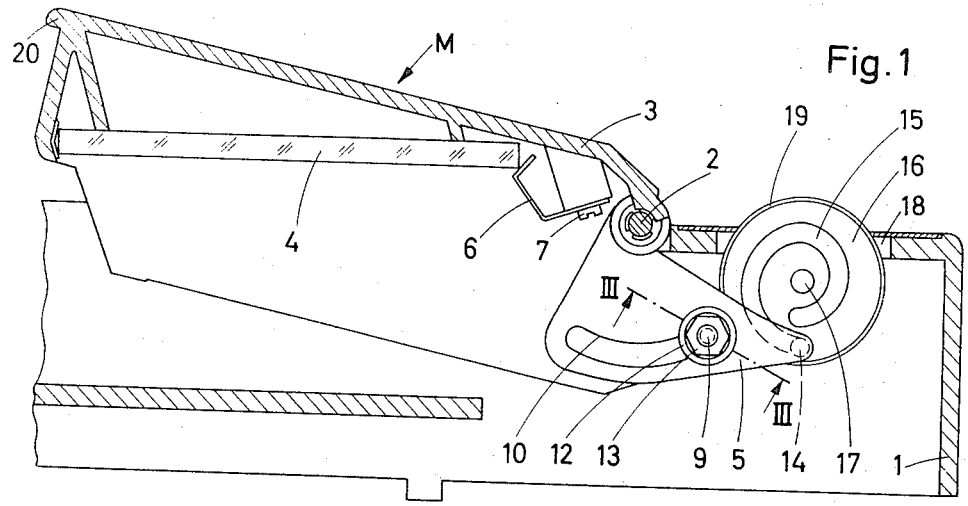
Fig. 1
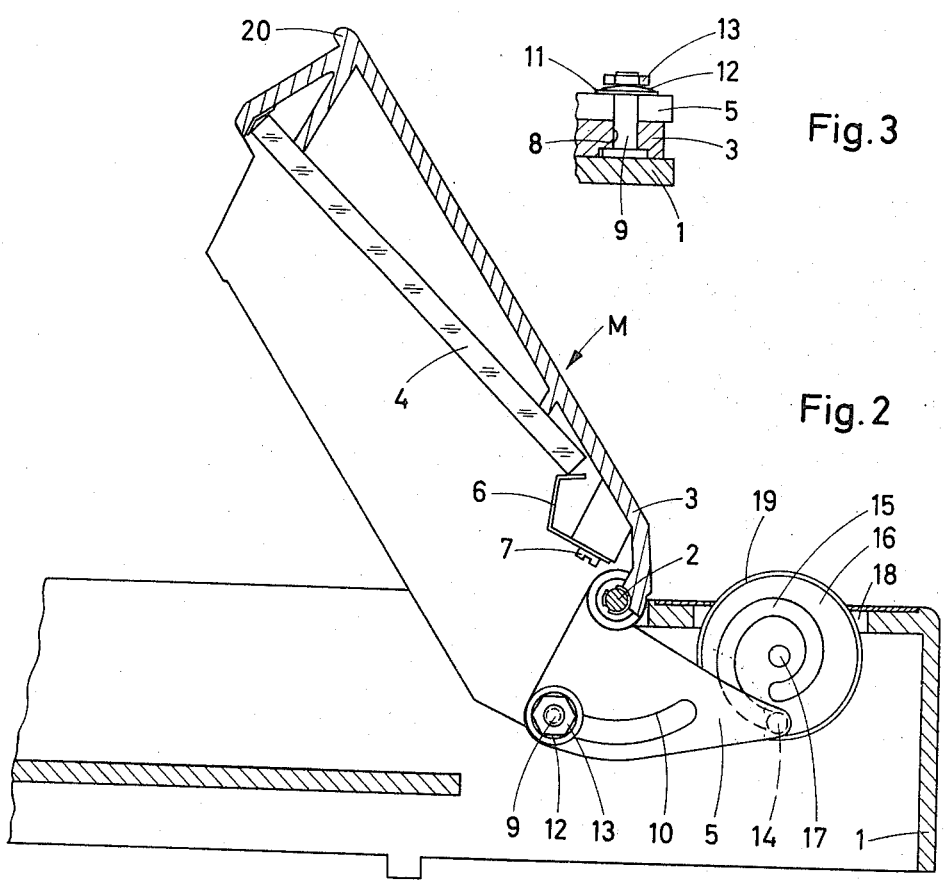
Fig. 3
Fig. 2

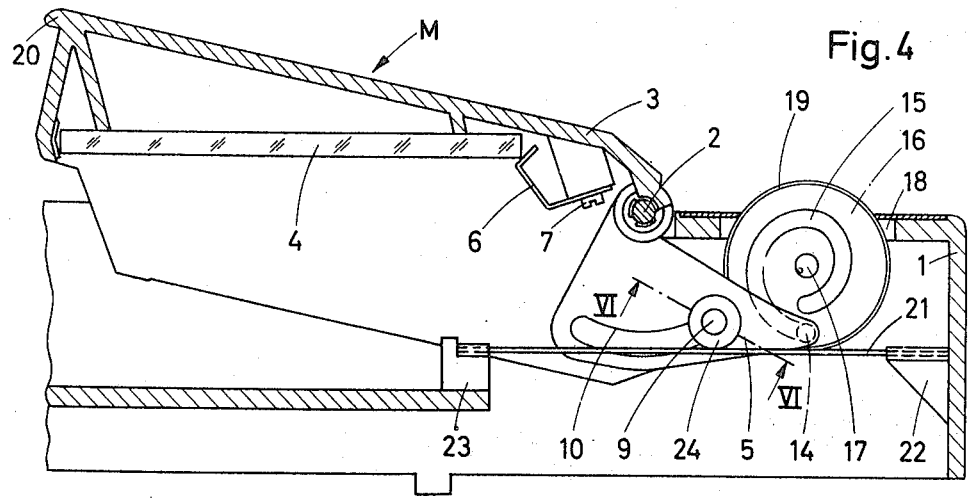
Fig. 4
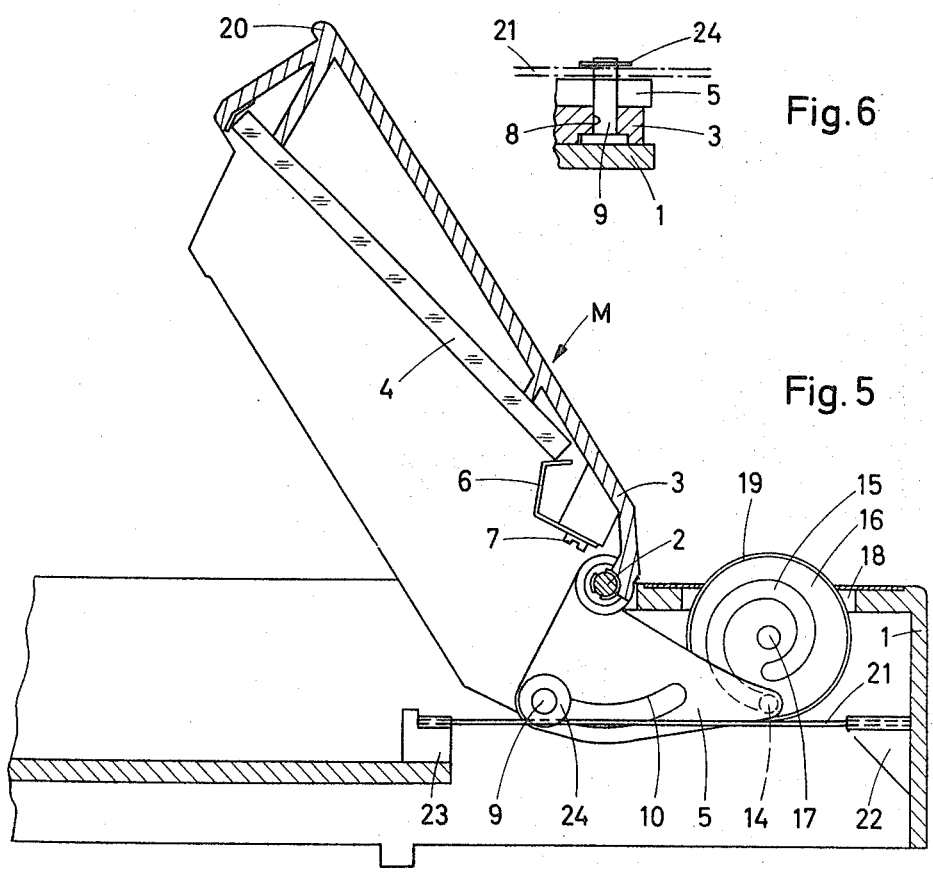
Fig. 6
Fig. 5

PROJECTOR WITH ADJUSTABLE IMAGE REFLECTING MIRROR

BACKGROUND OF THE INVENTION

The present invention relates to projectors in general, and more particularly to improvements in projectors of the type wherein one or more mirrors are movable into and from the path of light passing through or being reflected by a film frame or slide to thereby reflect or project the image of the frame or slide in a desired direction. An advantage of such projectors is that the position of the image which is being projected onto a screen or the like can be readily changed by pivoting or otherwise moving the mirror relative to the housing of the projector rather than by providing the projector housing with two or more adjustable legs which must be rotated or otherwise manipulated in order to change the direction in which the mirror or mirrors project the images. A drawback of presently known projectors with adjustable mirrors is that the mechanism for changing the position of a mirror is rather complex and also that such mechanism must be adjusted again and again, especially if the mirror is repeatedly moved from an image reflecting or projecting position to an inoperative position and vice versa.

SUMMARY OF THE INVENTION

An object of the invention is to provide a projector with a novel and improved mechanism for changing the position of an image reflecting or projecting mirror and to construct and assemble the mechanism in such a way that it prevents accidental changes in the projecting position of the mirror even if the latter is repeatedly moved to and from the selected projecting position.

Another object of the invention is to provide a simple, compact, inexpensive, rugged and versatile mirror adjusting mechanism for use in projectors for motion picture film, diapositives or the like.

A further object of the invention is to provide a self-locking mirror adjusting mechanism whose adjustment remains intact unless and until the adjustment is intentionally changed by the user of the projector.

An additional object of the invention is to provide a mirror adjusting mechanism which can be installed in presently known projectors without necessitating appreciable changes in the design and/or mode of operation of such projectors.

The invention is embodied in a projector which comprises a housing or an analogous support, at least one mirror which is movable relative to the support between at least one inoperative position and a plurality of image projecting or reflecting positions, and motion transmitting selector means mounted in the support and being adjustable therein (e.g., by means of a rotary cam) to thereby select for the mirror one of the plurality of projecting positions. The mirror and the selector means are preferably connected to each other by yieldable coupling means which causes the mirror to share the adjustments of the selector means relative to the support but enables the user to move the mirror relative to the selector means to and from the inoperative position.

In accordance with a presently preferred embodiment of the invention, the mirror and the selector means are pivotable about a common axis and the selector means is provided with an arcuate slot whose center of curvature is located on the common pivot axis and which receives a projection of the mirror so that the extent of movement of the mirror from its inoperative position is determined by the angular position of the selector means which thus selects the projecting position of the mirror.

The novel features which are considered as characteristic of the invention are set forth in particular in the appended claims. The improved projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary vertical sectional view of a projector including a mirror adjusting mechanism which embodies one form of the invention, the mirror being shown in the inoperative position;

FIG. 2 is a similar fragmentary sectional view but showing the mirror in one of its image projecting positions;

FIG. 3 is a fragmentary sectional view as seen in the direction of arrows from the line III—III of FIG. 1;

FIG. 4 is a view similar to that of FIG. 1 but showing a modified adjusting mechanism for a mirror which is illustrated in the inoperative position;

FIG. 5 shows the structure of FIG. 4 but with the mirror in one of its image projecting positions; and FIG. 6 is a fragmentary sectional view as seen in the direction of arrows from the line VI—VI of FIG. 4.

DESCRIPTION OF THE PREFERRED EMBODIMENTS

Referring to FIGS. 1 to 3, there is shown a portion of a projector which includes a housing or support 1 mounting a horizontal pivot member 2 for a holder 3 and an adjustable motion transmitting selector 5. The holder 3 forms part of a mirror M which further includes a light-reflecting plate 4. The plate 4 is held in the illustrated position by a spring 6 which is secured to the holder 3 by one or more screws 7 or analogous fasteners. That edge portion of the plate 4 which is remote from the pivot member 2 is caused by the spring 6 to bear against an internal surface of the holder 3.

As shown in FIG. 3, the holder 3 is formed with a bore 8 whose axis is parallel to the axis of the pivot member 2 and which receives a bolt-shaped projection 9 which is movable in an arcuate slot 10 of the selector 5. The center of curvature of the slot 10 is located on the axis of the pivot member 2. The projection 9 of the mirror M is surrounded by a friction disk 11 which is adjacent to the outer side of the selector 5 (namely, to that side of the selector 5 which faces away from the bore 8 in the holder 3). The friction disk 11 is biased against the selector 5 by a resilient element here shown as a dished spring 12 whose bias can be adjusted by a nut 13 meshing with the adjacent end portion of the projection 9.

The selector 5 is further provided with a pin-shaped follower 14 which is remote from the pivot member 2 and extends into a helical groove 15 provided in a rotary adjusting cam 16. The latter is turnable in the housing 1 about the axis of a shaft 17 which is parallel to the pivot member 2. A handgrip portion of the adjusting cam 16 extends outwardly through an opening 18 in the top wall of the housing 1 so that it can be grasped and rotated by hand. The periphery of the cam 16 is preferably knurled, serrated or otherwise roughened, as at 19.

The operation of the structure shown in FIGS. 1 to 3 is as follows:

In FIG. 1, the holder 3 maintains the plate 4 of the mirror M in a concealed or inoperative position in which the mirror M cannot project the image of a film frame or slide against a screen, not shown. The projection 9 of the mirror M is adjacent to the right-hand end of the arcuate slot 10 in the selector 5. In order to move the mirror M to the operative or image reflecting or projecting position shown in FIG. 2, the user of the projector grasps a projection 20 of the holder 3 and pivots the latter in a clockwise direction whereby the projection 9 travels along the slot 10 and prevents further clockwise pivoting of the holder 3 and plate 4 when it strikes against the surface bounding the left-hand end of the slot 10. If the image which is being reflected by the plate 4 is not observable on a desired portion of a screen, the user simply turns the adjusting cam 16 by way of the roughened peripheral surface 19 of that (handgrip) portion of the cam 16 which extends outwardly beyond the opening 18 whereby the surfaces bounding the groove 15 pivot the selector 5 by way of the pin-shaped follower 14 so that the selector changes the inclination of the plate 4 and holder 3 until the image is projected onto the desired portion of the screen. It will be noted that the holder 3 and the plate 4 of the mirror M can pivot relative to the selector 5 from an inoperative position to a previously selected projecting position but that the mirror M shares the movements of the selector 5 once it reaches a projecting position. This enables the user to move the mirror M between a practically unlimited number of different projecting positions by the simple expedient of rotating the adjusting cam 16 while the projection 9 abuts against the surface bounding the left-hand end of the slot 10.

When the user decides to return the mirror M to the inoperative position of FIG. 1, the holder 3 is simply pivoted in a counterclockwise direction while the angular position of the selector 5 remains unchanged. This renders it possible to return the mirror M to the previously selected projecting position as often as necessary without requiring any further rotation of the adjusting cam 16. Friction which is generated by the nut 13 and resilient element 12 between the parts 3, 5 and 11 suffices to insure that the holder 3 remains in any selected intermediate position relative to the selector 5 unless the user applies sufficient force to intentionally overcome such friction. This also holds true for both end positions of the holder 3, i.e., for the inoperative position and the selected projecting position of the mirror M.

The parts 9, 11, 12 and 13 constitute a simple friction coupling which yieldably connects the holder 3 of the mirror M for pivotal movement with the selector 5 but allows the mirror M to pivot relative to the selector 5 to and from the inoperative position of FIG. 1. The connection between the cam 16 and the selector 5 is of the self-locking type, i.e., the cam 16 can pivot the selector 5 when it is caused to rotate on the shaft 17 but the selector cannot rotate the cam when the user pivots the mirror M so that the projection 9 travels in the slot 10.

If desired, the friction coupling 9, 11–13 (which is remote from the axis of the pivot member 2) can be replaced by a friction coupling which is mounted on the pivot member 2.

FIGS. 4 to 6 illustrate a portion of a second projector wherein all such parts which are identical with or clearly analogous to the corresponding parts of the first projector are denoted by similar reference characters. In this second projector, a portion of the structure shown in FIG. 3 has been replaced by a coupling which employs an elongated resilient element in the form of a bistable elastic wire 21. The two end portions of the resilient element 21 are anchored in the housing 1, as at 22 and 23. That end portion of the projection 9 which is remote from the arcuate slot 10 extends beyond the outer side of the selector 5 and carries a washer 24 which confines an intermediate portion of the resilient element 21. The element 21 is under tension so that it bears against the peripheral surface of the projection 9 between the washer 24 and the outer side of the selector 5 not only when the mirror M dwells in an intermediate position but also when the mirror M dwells in one of its projecting positions or in the inoperative position of FIG. 4.

When the user grips the projection 20 and pivots the mirror M from the inoperative position of FIG. 4 to a projecting position such as the one shown in FIG. 6, the projection 9 stresses the resilient element 21 during travel toward the left-hand end of the slot 10 whereby the tension of the element 21 increases during the first stage and thereupon decreases during the second stage of movement of the projection 9 from the position of FIG. 4 to the position of FIG. 5. In fact, during the aforementioned second stage, the resilient element 21 assists the user in moving the mirror M to that angular position in which the projection 9 abuts against the surface bounding the left-hand end of the slot 10. The bias of the resilient element 21 can be readily selected in such a way that this element automatically moves the holder 3 to the position of FIG. 5 as soon as the projection 9 has been moved to and only slightly beyond an intermediate position corresponding to the dead-center or neutral position of the resilient element 21. Analogously, the resilient element 21 can automatically return the holder 3 all the way to the position of FIG. 4 as soon as the projection 9 reaches and moves slightly beyond that intermediate position which corresponds to the neutral position of the resilient element 21 (while the projection 9 moves from the position of FIG. 5 back toward the position of FIG. 4). In other words, the biastable resilient element 21 can urge the mirror M to the position of FIG. 4 or 5.

The manner in which the angular position of the selector 5 can be changed in response to rotation of the adjusting cam 16 is the same as described in connection with FIGS. 1 to 3.

The parts 9 and 21 also constitute a coupling which yieldably connects the mirror M with the selector 5 so that the mirror shares the angular movements of the selector but is pivotable relative to the selector to and from the position of FIG. 4.

The advantages of the improved mirror adjusting mechanism can be summarized as follows: Since the action between the follower 14 and the cam 16 is self-locking, pivotal movements of the mirror M relative to the selector 5 cannot change the angular position of the cam 16. Therefore, the mirror M can be moved to and from a selected projecting position as often as necessary without changing the angular position of the selector 5. On the other hand, the angular position of the selector 5 can be changed by the simple expedient of rotating the cam 16 whereby the user selects a different projecting position for the mirror M. The coupling of FIG. 3 insures that the mirror M cannot change its angular position relative to the selector 5 unless the user applies a force which is sufficient to overcome the bias of the spring 12 in order to move the projection 9 of the mirror M along the slot 10 of the selector 5. Thus, the spring 12 of the friction coupling between the holder 3 and the selector 5 insures that the mirror M cannot leave its selected projecting position or its inoperative position due to shocks, vibrations or other stray movements of the support 1. This simplifies the construction and renders it possible to omit special safety or locking devices which are normally provided to hold an adjustable mirror in selected projecting position or in its inoperative position.

An advantage of the resilient element 21 is that it actually urges the mirror M to its inoperative position or to the selected projecting position as soon as the mirror M begins to approach the inoperative position or a projecting position.

The cam 16 does not detract from the appearance of the projector because it suffices if only a small (handgrip) portion of this cam extends beyond the housing 1 so that it can be engaged and rotated by one or more fingers.

It is clear that the improved mirror adjusting mechanism is susceptible of many additional modifications without departing from the spirit of the invention. For example, the resilient element 21 can be replaced by other types of resilient means which can oppose movements of the mirror from its inoperative position as well as from the selected projecting position. Also, the selector 5 can be installed for reciprocatory rather than pivotal movement relative to the housing, and the slot 10 can be provided in the holder 3, i.e., the projection 9 can be provided on the selector 5.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by letters Patent is set forth in the appended claims.

1. In a projector, a combination comprising a support; mirror means mounted on and movable relative to said support between at least one inoperative position and a plurality of image-projecting positions, said mirror means including first abutment means; and selector means mounted on said support and including second abutment means located in the path of movement of said first abutment means during movement of said mirror means from said inoperative position and being adjustable relative to said support between a plurality of positions each of which corresponds to a different image-projecting position of said mirror means, said mirror means being repeatedly movable between said inoperative position and that image-projecting position in which said first abutment means abuts against said second abutment means so that the image-projecting position of the mirror means, when said first abutment means abuts against said second abutment means, is determined by the position of said selector means with respect to said support.

2. A combination as defined in claim 1, wherein said selector means is adjustable in said support in two different directions and said mirror means is arranged to share the movements of said selector means in at least one of said directions.

3. A combination as defined in claim 1, further comprising coupling means for yieldably connecting said mirror means with said selector means so that said mirror means shares the adjustments of said selector means relative to said support but is movable relative to said selector means to and from said inoperative position thereof.

4. A combination as defined in claim 3, wherein said coupling means comprises means for yieldably holding said mirror means in said inoperative position.

5. A combination as defined in claim 1, wherein said mirror means is pivotable in said support between said inoperative and said projecting positions thereof.

6. A combination as defined in claim 5, further comprising coupling means for pivoting said mirror means in response to adjustment of said selector means relative to said support, said mirror means being movable relative to said selector means to and from said inoperative position against the opposition of said coupling means.

7. A combination as defined in claim 1, further comprising a friction coupling interposed between said mirror and said selector means to move said mirror means in response to adjustment of said selector means and to permit movements of said mirror means to and from said inoperative position relative to said selector means.

8. A combination as defined in claim 1, further comprising coupling means interposed between said mirror means and said selector means to move said mirror means with said selector means in response to adjustment of said selector means relative to said support and to permit said mirror means to move relative to said selector means to and from said inoperative position thereof, said coupling means comprising bistable resilient means arranged to oppose movements of said mirror means from said inoperative and from said projecting positions thereof.

9. A combination as defined in claim 1, further comprising adjusting means for said selector means.

10. A combination as defined in claim 9, wherein said adjusting means comprises cam means movably mounted in said support and follower means provided on said selector means and arranged to track said cam means.

11. A combination as defined in claim 10, wherein said cam means is a rotary cam having a handgrip portion extending from said support and a cam face which is tracked by said follower means, said cam face and said follower means being in engagement with a self-locking action to thus prevent changes in the position of said cam by way of said selector means.

12. A combination as defined in claim 1, wherein said support includes a pivot member and said mirror means is pivotable about the axis of said pivot member, said selector means being adjustable relative to said support about said axis of said pivot member and further comprising coupling means coaxial with said pivot member and arranged to yieldably connect said mirror means with said selector means so that the mirror shares the adjustments of said selector means and is pivotable relative to said selector means to and from said inoperative position thereof.

13. A combination as defined in claim 1, wherein said mirror means and said selector means are pivotable relative to said support about a common axis and further comprising coupling means remote from said common axis and yieldably connecting said mirror means with said selector means so that said mirror means shares the adjustments of said selector means about said common axis and is pivotable about said common axis relative to said selector means to and from said inoperative position thereof.

14. A combination as defined in claim 1, further comprising resilient means mounted in said support and arranged to yieldably oppose the movements of said mirror means from said inoperative as well as from said projecting positions thereof.

15. A combination as defined in claim 1, wherein said mirror means and said selector means are pivotable relative to said support about a common axis and said selector means comprises an arcuate slot having its center of curvature located on said axis and having one closed end serving as second abutment means, said mirror means having a projection extending into said slot and serving as first abutment means.

16. In a projector, a combination comprising a support; a mirror movable relative to said support between at least one inoperative position and a plurality of image-projecting positions; motion transmitting selector means mounted in said support and being adjustable therein to thereby select for said mirror one of said plurality of projecting positions, said mirror being movable relative to said selector means between said one projecting positions and said inoperative position; and resilient means mounted in said support and arranged to yieldably oppose the movements of said mirror from said inoperative as well as from said projecting positions thereof, said resilient means comprising an elastic wire having two end portions fixedly secured to said support and an intermediate portion, said mirror having a projection which is engaged by and moves relative to said intermediate portion of said wire in response to movement of said mirror with and relative to said selector means.

* * * * *